United States Patent [19]

Marzoli

[11] Patent Number: 4,890,358
[45] Date of Patent: Jan. 2, 1990

[54] SYSTEM FOR AUTOMATICALLY CONVEYING COTTON LAPS FROM A RIBBON-LAP MACHINE TO A COMBING MACHINE ASSEMBLY

[76] Inventor: Pietro B. Marzoli, Via Durante, 1-25036 Palazzolo sull'Oglio (Brescia), Italy

[21] Appl. No.: 248,359

[22] Filed: Sep. 23, 1988

[30] Foreign Application Priority Data

Oct. 13, 1987 [IT] Italy ................. 22255 A/87

[51] Int. Cl.$^4$ ............................................. D01B 3/04
[52] U.S. Cl. .................................. 19/115 R; 19/65 R
[58] Field of Search ............... 19/65 R, 115 R, 236, 19/276, 281

[56] References Cited

U.S. PATENT DOCUMENTS 3,388,432 6/1968 Saikawa et al. ............... 19/115 R X
3,440,688 4/1969 Yamamoto et al. ............... 19/65 R
3,904,050 9/1975 Kimura et al. ................. 19/65 R X
4,528,721 7/1985 Hera ............................. 19/115 R X Primary Examiner—Donald Watkins
Attorney, Agent, or Firm—Bucknam and Archer

[57] ABSTRACT

The system comprises, downstream of a ribbon-lap machine, a cradle lifting device for taking up a lap roller from a lap roller collecting frame, a gripper taking up device being moreover provided which is adapted to remove a lap roller from the cradle lifting device and to load an empty roller on an empty roller collecting frame, the gripper taking up device being supported on a carriage slidable on a guide path so as to selectively reach a combing machine preselected from an assembly of combing machines in order to discharge the lap roller on a lap roller supplying frame while simultaneously taking up an empty roller.

2 Claims, 2 Drawing Sheets

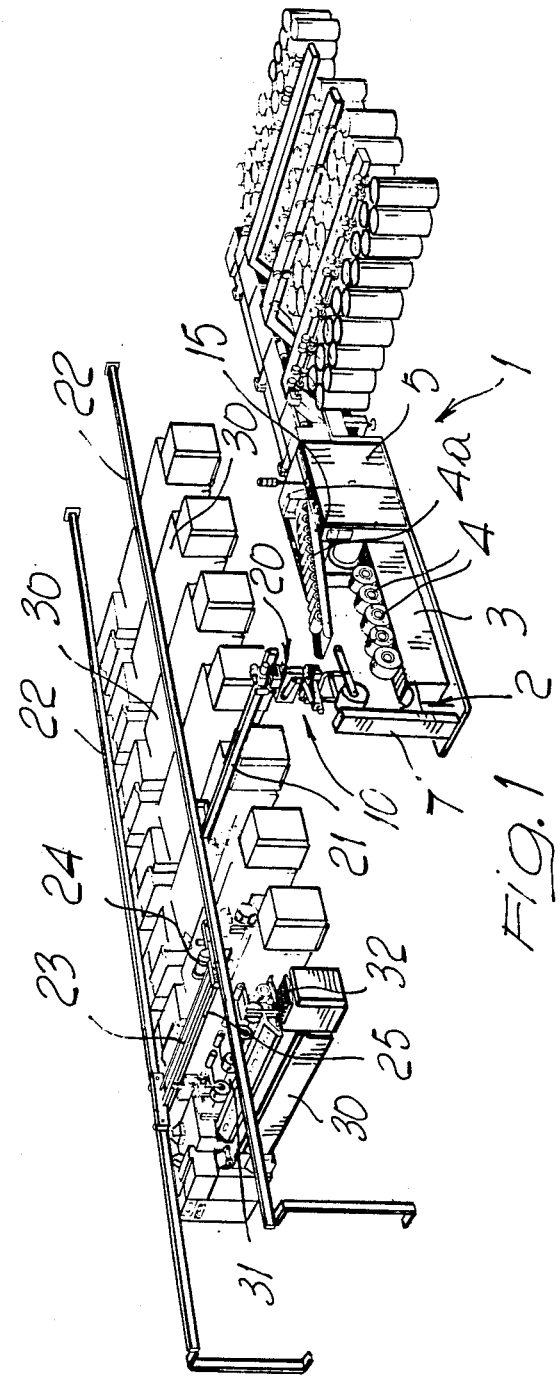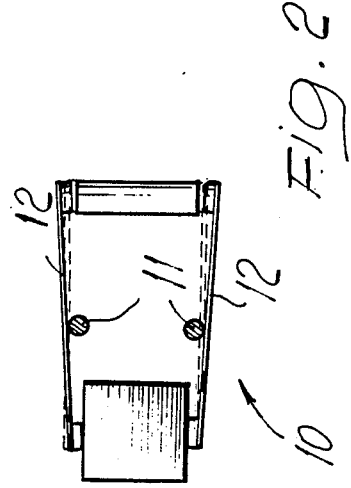

SYSTEM FOR AUTOMATICALLY CONVEYING COTTON LAPS FROM A RIBBON-LAP MACHINE TO A COMBING MACHINE ASSEMBLY

BACKGROUND OF THE INVENTION

The present invention relates to a system for automatically conveying cotton laps from a ribbon-lap machine to a combing machine assembly.

As is known a presently felt problem in the textile field is that of operatively intercoupling the ribbon-lap machines to the combing machines.

Known methods provide for the use of a great amount of labour and means for conveying the laps from the ribbon-lap machine to the combing machine, as well as for supplying the ribbon-lap machine with lap rollers.

Another drawback is that known conveying systems have a very large size and a poor efficiency.

SUMMARY OF THE INVENTION

Accordingly, the main object of the present invention is to overcome the above mentioned drawbacks, by providing a system for automatically conveying cotton laps from a ribbon-lap machine to a combing machine assembly which, in addition to conveying the cotton laps in a completely automatic way, also affords the possibility of automatically preselecting the combing machines which are to be fed.

Another object of the present invention is to provide a conveying system of very reduced size and high operating efficiency.

Another object of the present invention is to provide a conveying system which can be constructed with different configurations so as to perfectly meet the user requirements.

Still another object of the present invention is to provide a conveying system which is very reliable and of comparatively low cost.

According to one aspect of the present invention, the above mentioned objects, as well as yet other objects, which will become more apparent hereinafter, are achieved by a system for automatically conveying cotton laps from a lap-ribbon machine to a combing machine assembly characterized in that said system comprises, downstream of said lap-ribbon machine, a cradle lifting device for taking up a lap roller from a collecting frame, a gripper taking up device being moreover provided adapted to take up a lap roller from said cradle lifting device and to discharge onto a collecting frame or board an empty roller.

Advantageously the mentioned gripper device is supported by a movable carriage which is able of sliding on a guide path so as to selectively reach a combing machine, which can be preselected from an assembly of combing machines, in order to discharge the lap roller on a supply frame while simultaneously taking up an empty roller.

BRIEF DESCRIPTION OF THE DRAWINGS

Further characteristics and advantages of the invention will become more apparent hereinafter from the following detailed description of two embodiments of a system for automatically conveying cotton laps from a ribbon-lap machine to a combing machine assembly which are illustrated, by way of an indicative but not limitative example, in the figures of the accompanying drawings, where:

FIG. 1 is a schematic perspective view illustrating a conveying system according to the present invention in which the combing machines have a parralel arrangement;

FIG. 2 is a schematic top plan view illustrating a gripper device; and

DESCRIPTION OF THE PREFERRED EMBODIMENTS

Figure 3:
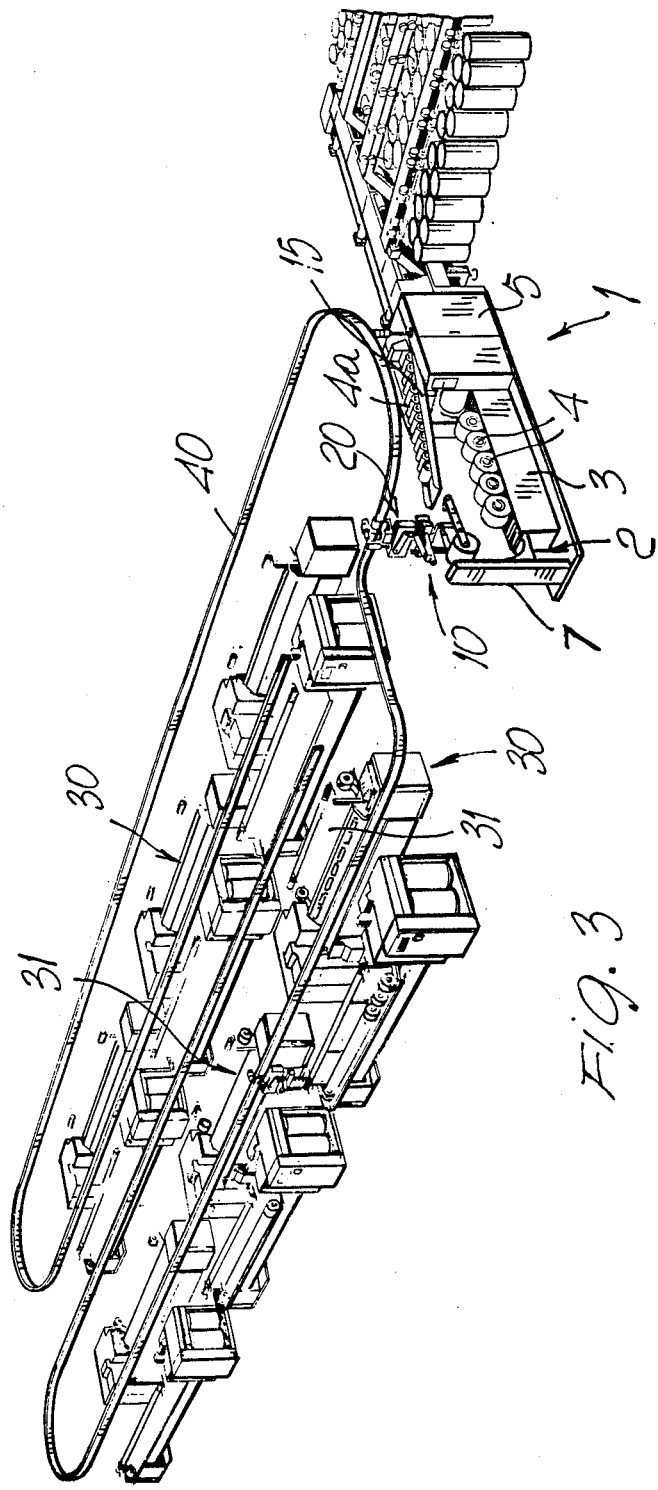
FIG. 3 is a schematic view illustrating a conveying system according to the present invention in which the combing machines have a series arrangement.

With reference to the figures of the accompanying drawings, the system for automatically conveying cotton laps from a ribbon-lap machine to a combing machine assembly according to the present invention comprises, downstream of said ribbon-lap machine, indicated overall by the reference number 1, a cradle lifting device or elevator 2, which is arranged at one end of a frame or bench 3 for collecting lap rollers 4.

More specifically, the lap rollers 4 are fed from a winding device 5, thereat a given number of ribbons are transformed into a given or set weight lap by means of a drawing process in which the ribbons are drawn and wound on an empty roller indicated at 4a.

The cradle lifting device is in turn supported by an upright 7 able of upwardly displacing the lap roller 4 for automatically arranging it on the mentioned end portion of the collecting frame 3.

At said cradle lifting device 2 there is provided a gripper take up device, indicated overally at the reference number 10, which comprises, as shown in a more detailed way in FIG. 2, a supporting frame 11 thereon there are pivoted two jaw pairs 12 having opposite end portions and able of alternately operating, as disclosed in a more detailed way hereinafter.

At the gripping zone of said gripper device 10 there is provided a frame 15 for collecting the empty roller 4a to be supplied again to the winding device of the ribbon-lap machine 1.

The pivoted jaw pairs 12 are able, as the are rotated on their pivot pins, to take up a lap roller and simultaneously release an empty roller of the empty roller collecting frame or bench.

As shown, the gripper take up device 10 is supported on a carriage 20 able of sliding on a guiding path in order to selectively reach a combing machine, which can be preselected from an assembly of combing machines, to discharge the lap roller on a supplying frame while simultaneously removing the empty roller.

As shown in FIG. 1, the guiding path comprises a single rail 21 thereon said carriage 20 is able of sliding, said single rail being arranged perpendicular to a rail pair 22 thereon a bridge crane 23 slides.

The bride crane 23 is provided with a driving motor 24, supporting a transfer single rail 25 which constitutes an extension of the mentioned single rail 21.

With the disclosed arrangement, the combing machines 30 are arranged with an adjoining relationship under the region encompassed by the rail pair 22.

Thus, as the bridge crane 23 is displaced on the rails 22, the lap roller, supported by the gripper device 10, will be supplied to the loading board 31 of the selected combing machine and, simultaneously, the empty roller will be removed.

In order to automatically arrange the carriage 20 at the selected combing machine, there is provided a photocell system, supported by said carriage 20 or by the bridge crane 23, which can be actuated by reflector members 32 supported by the system frames.

Thus, by tilting or covering a reflector member 32, it will be possible to override a combing machine, as the lap roller is to be supplied to another combing machine.

As shown in FIG. 3, the guiding path consists of a continuous rail, indicated at 40, which has its middle portion substantially arranged at the ribbon-lap machine region.

The carriage 20 slides on the continuous rail extending on both sides on combing machines which are arranged in a series relationship to be engaged by the sliding carriage 20 one after the other, whereas in the previously illustrated embodiment the combing machines were arranged with a parralel arrangement.

During the operation of the system according to the present invention, the gripper take up device will take up from the cradle the lap roller 4 and, simultaneously, will release the empty roller.

Then, the carriage 20 will be displaced on its guiding path and brought to the preselected combing machine, thereat said gripper device will be actuated again to release, by means of the pivoting jaws, a lap roller while simultaneously removing the empty roller.

From the above description it should be apparent that the invention fully achieves the intended objects.

While the invention has been disclosed and illustrated with reference to preferred embodiments thereof, it should be apparent that the disclosed embodiments are susceptible to several modifications and variations all of which will come within the spirit and scope of the appended claims.

I claim:

1. A system for automatically conveying cotton laps from a ribbon-lap machine to a combing machine assembly comprising, downstream of said ribbon-lap machine, a sliding cradle lifting device adapted to take up a lap roller from a lap roller collecting frame, a gripper take up device adapted to take up said lap roller from said cradle lifting device and to discharge an empty roller on an empty roller collecting frame arranged above said lap roller collecting frame, said gripper take up device being supported on a carriage sliding on a guiding path so as to selectively reach a combing machine selected from said combing machine assembly to discharge said lap roller on a lap roller supplying frame while simultaneously taking up said empty roller, said gripper take up device being provided with a supporting frame thereon there are pivoted roller engaging jaw pairs, said system further comprising a pair of spaced rails slidingly supporting a bridge crane, wherein said guiding path consists of a further rail extending in a continuous manner above said combing machine assembly and slidingly supporting said carriage, and arranged substantially perpendicular to said pair of spaced rails, said bridge crane supporting a transfer rail arranged as an extension of said further rail, and being driven for displacement above said combing machine assembly.

2. A system according to claim 1 further comprising a photocell assembly and a cooperating reflector assembly for stopping said carriage at a given combing machine of said combing machine assembly.

* * * * *